No. 764,924. PATENTED JULY 12, 1904.
P. K. DEDERICK.
BALE OR PACKAGE OF FIBROUS MATERIAL.
APPLICATION FILED OCT. 27, 1902.
NO MODEL.
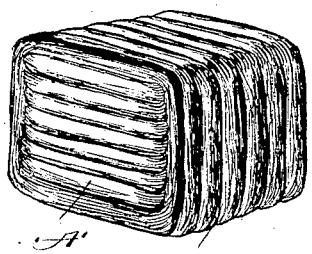
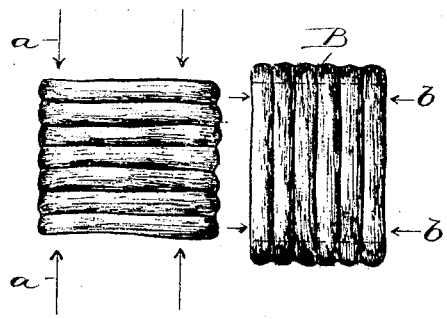   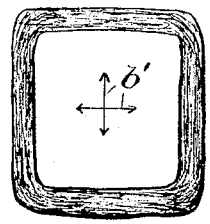
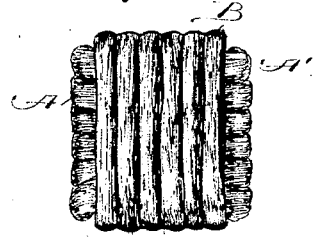
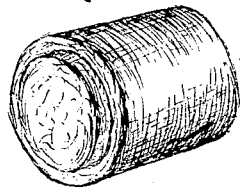
Witnesses
J. M. Fowler Jr.
Thomas Durant
Inventor
Peter K. Dederick
By Church & Church
his Attorneys No. 764,924. Patented July 12, 1904.

UNITED STATES PATENT OFFICE.

PETER K. DEDERICK, OF ALBANY, NEW YORK.

BALE OR PACKAGE OF FIBROUS MATERIAL.

SPECIFICATION forming part of Letters Patent No. 764,924, dated July 12, 1904.

Application filed October 27, 1902. Serial No. 129,005. (No model.)

*To all whom it may concern:*

Be it known that I, PETER K. DEDERICK, of Albany, in the county of Albany, State of New York, have invented certain new and useful Improvements in Baling or Packages of Fibrous Material; and I do hereby declare the following to be a full, clear, and exact description of the same, reference being had to the accompanying drawings, forming a part of this specification, and to the letters of reference marked thereon.

This invention relates to improvements in bales or packages of fibrous material such as are given an initial compression and held in a compressed or condensed condition during transportation, storage, &c., or until it is desired to break the bale or package, the objects of the invention being to produce a bale or package which in itself shall be so formed as to retain its form and density without necessitating the employment of the usual bands, ties, or coverings which are applied to the compressed material and fastened to prevent expansion, &c.

The invention consists in a bale or package of fibrous material formed in sections, with the sections so assembled that each is maintained by the other.

In the simplest form the bale or package is composed of an inner section pressed to expand as in an ordinary bale and an outer section extending continuously around the inner section in a direction to confine the same and being itself compressed transversely. The ends of the inner section, however, preferably extend beyond the outer section to aid in retaining the latter.

In the accompanying drawings, Figure 1 and Fig. 2 are perspective views of bales or packages made in accordance with the present invention. Fig. 3 is a diagrammatic view illustrating the method of formation of the bale shown in Fig. 1. Fig. 4 is a view looking at the end of the outer section, Fig. 3. Fig. 5 is an elevation of the completed bale or package, Fig. 1.

Like letters of reference indicate the same parts.

The inner section of the bale or package illustrated in the drawings may be a single mass of hay or other loose fibrous material compressed to the desired density, or it may be composed of a number of sections or layers compressed or rolled together, corresponding closely to the ordinary quadrilateral bale or the ordinary roll or round bale, adapted to be bound by metal bands passing around the same in one direction. The outer section B may also be formed of a single mass of loose fibrous material or in sections or layers. The outer section surrounds the inner section in the form of a continuous band and is preferably compressed transversely of the layers or in direction parallel with the central opening. It serves to confine the inner section, while the friction between the sections and the expanded ends A' of the inner section serve to confine the outer section.

The inner and outer sections may be of fibrous material differing in character, as one may be of hay and the other of straw; but it is preferred that they be of the same character, whereby the whole may be devoted to one use and no separation for use is necessary.

With this invention the producer may bale his product without the expense or bother of providing bale ties and bands, and the consumer is relieved of the necessity of removing such bands and disposing of the same, to say nothing of the elimination of the danger to machinery and stock incident to the use of the ordinary metal bands or covers now in use.

Having thus described my invention, what I claim as new, and desire to secure by Letters Patent, is—

1. A bale of loose fibrous material composed of an inner pressed section or sections and an outer pressed section or sections transversely combined to confine and retain each other; substantially as described.

2. A bale or package of loose fibrous material embodying an inner pressed section, and an outer section of fibrous material forming a continuous band within which the inner section is confined; as set forth.

3. A bale or package of loose fibrous material embodying an inner section compressed to expand transversely and an outer section of fibrous material forming a continuous band within which the inner section is confined, as set forth.

4. A bale or package of loose fibrous material embodying an outer section having a central opening and compressed in a direction parallel with said opening, and an inner section compressed transversely and confined in the outer section, as set forth.

5. A bale or package of loose fibrous material embodying an outer section having a central opening and compressed in a direction parallel with said opening and an inner section compressed transversely and confined in the outer section, the ends of the inner section extending beyond the outer section to confine the latter; substantially as described.

6. A bale or package of loose fibrous material embodying an outer section formed in layers each having a central opening, said section being compressed transversely of the layers in a direction parallel with the central opening and an inner section compressed transversely and confined in the outer section; substantially as described.

7. A bale or package of loose fibrous material embodying an outer section formed in layers each having a central opening, said section being compressed transversely of the layers in direction parallel with the central opening and an inner section compressed transversely and confined in the outer section, the ends of the inner section projecting beyond the outer section and serving to confine the latter; substantially as described.

8. A bale or package of loose fibrous material embodying an outer section formed in layers each having a central opening, said section being compressed transversely of the layers in direction parallel with the central opening and an inner section formed in layers compressed transversely of the layers and confined in the outer section, substantially as described.

9. A bale or package of loose fibrous material embodying an outer section formed in layers each having a central opening, said section being compressed transversely of the layers in direction parallel with the central opening and an inner section formed in layers compressed transversely of the layers and confined in the outer section, the ends of the inner section projecting beyond the outer section and serving to confine the latter; substantially as described.

PETER K. DEDERICK.

Witnesses:
F. X. CLEMENT,
M. LINACRE.